United States Patent [19]
Diwell et al.

[11] Patent Number: 4,478,797
[45] Date of Patent: Oct. 23, 1984

[54] EXHAUST GAS PURIFICATION

[75] Inventors: Alan F. Diwell, Reading; Andrew Salathiel, Wembley, both of England

[73] Assignee: Johnson Matthey & Company Limited, London, England

[21] Appl. No.: 422,145

[22] Filed: Sep. 23, 1982

Related U.S. Application Data

[63] Continuation of Ser. No. 240,235, Mar. 3, 1981.

[30] Foreign Application Priority Data

Mar. 10, 1980 [GB] United Kingdom ............. 8008068

[51] Int. Cl.$^3$ .............................................. B01D 53/36
[52] U.S. Cl. .................................. 423/213.5; 502/313; 502/332; 502/334; 502/350
[58] Field of Search .................... 423/213.5, 213.7; 252/455, 456, 460, 466 B, 466 PT; 502/305, 313, 326, 327, 332, 349, 310, 334

[56] References Cited

U.S. PATENT DOCUMENTS

| | | | |
|---|---|---|---|
| 3,065,595 | 11/1962 | Gary | 423/213.2 X |
| 3,554,929 | 1/1971 | Aarons | 423/213.5 X |
| 3,839,224 | 10/1974 | Yonehara et al. | 423/213.5 |
| 3,840,471 | 10/1974 | Acres | 252/466 B |
| 3,990,995 | 11/1976 | McArthur | 423/213.5 X |
| 4,096,095 | 6/1978 | Cairns | 423/213.5 X |
| 4,117,082 | 9/1978 | Matsuyama | 423/213.5 X |
| 4,189,405 | 2/1980 | Knapton et al. | 252/466 PT |
| 4,237,032 | 12/1980 | Evans et al. | 423/213.5 |

FOREIGN PATENT DOCUMENTS 972683 10/1964 United Kingdom ............. 423/213.5

Primary Examiner—Earl C. Thomas
Attorney, Agent, or Firm—Cushman, Darby & Cushman

[57] ABSTRACT

An oxidation catalyst for use in a catalytic exhaust gas purification unit comprises a substrate on which a refractory metal oxide is coated, a base metal component and one or more metals from the Platinum Group. The catalyst is highly effective when a metallic substrate is employed and the loading of the refractory metal oxide coating is relatively high. The base metal is useful for catalysts having a ceramic substrate and a relatively low coating loading.

13 Claims, 4 Drawing Figures

EXHAUST GAS PURIFICATION

This is a continuation of application Ser. No. 240,235 filed Mar. 3, 1981.

This invention relates to exhaust gas purification and in particular to the catalytic purification of exhaust gas from internal combustion engines.

The petroleum fuel used in spark-ignition internal combustion engines is graded by its octane number which is the percentage by volume of 2,2,4-trimethylpentane (iso octane) in a mixture of 2,2,4-trimethylpentane and normal heptane which has the same knocking characteristics as the fuel under test. The knock of an internal combustion engine is the characteristic metallic noise which results from out of sequence detonation, i.e., the spontaneous combustion of the compressed charge. In an attempt to prevent knocking, anti-knock substances such as tetraethyl lead or tetramethyl lead are added to the fuel. Other additives are often present in the fuel in addition to the anti-knock substances to aid removal of the lead compounds from the vicinity of the cylinder and valves and into the exhaust gas stream. Two such additives commonly called "scavengers" are 1,2-dichloroethane (ethylene dichloride, EDC) and 1,2-dibromoethane (ethylene dibromide, EDB). When a catalytic exhaust gas purification unit is positioned in the exhaust gas stream of an internal combustion engine a lead-free petroleum fuel has to be used to prevent poisoning of the catalytic components, such as platinum metal in the unit.

An object of the present invention is to provide an oxidation catalyst for use in a catalytic exhaust gas purification unit, fitted to an internal combustion engine which is resistant to poisoning by lead compounds and other additives present in the exhaust gas stream.

According to the present invention an oxidation catalyst comprises one or more platinum group metals and a base metal component deposited upon a substrate coated with a refractory metal oxide.

A base metal is an oxygen-containing component formed by one or more metals selected from Groups IV, VI and VIII of the Periodic Table and base metal components preferred are $SnO_2$, $WO_3$, $TiO_2$ and $NiMoO_4$. Preferably the refractory metal oxide is alumina.

The substrate is preferably a monolithic structure fabricated from a ceramic or metallic material. Suitable ceramic materials are zircon-mullite, mullite, alumina sillimanite, magnesium silicate, kaolin clays, zircon, petalite, spodumene, cordierite and most alumina silicates. Oxidation-resistant metals or alloys are preferably used as the metallic material.

The loading of the refractory metal oxide coating or "washcoat" layer is between 0.5 g in$^{-3}$ and 20 g in$^{-3}$. The base metal component should be present at between 50 and 2,000 g ft$^{-3}$ and the platinum group metal or metals at between 10 and 150 g ft$^{-3}$.

A number of catalysts containing a platinum group metal and a base metal component were prepared and tested in a rig built to produce simulated exhaust gas from an internal combustion engine. The rig has a modified pulse flame reactor such that fuel can be injected into the reactor, mixed with air and ignited, by means of a propane gas pilot light, in a double conical combustion chamber. The fuel inlet was adjusted so that substantially stoichiometric combustion of the fuel took place. A further addition of air, commonly called 'secondary air', was added to the exhaust gas stream, after the combustion chamber so that there was a 0.5% excess of oxygen present in the exhaust gas stream as it passed over the catalyst. The exhaust gas stream contains approximately 70 ppm NOx. The fuel used contained 0.4 gl$^{-1}$ of lead, present as tetramethyl lead, and as lead scavengers, 1 theory, 1,2-dichloroethane and ½ theory 1,2-dibromoethane where a "theory" is the amount of scavenger that theoretically will react with all the lead present to form "the appropriate lead dihalide", a compound that is easily removed from the engine and into the exhaust gas stream.

The duration of each test was 8 hours, the hydrocarbon levels present in the exhaust gas stream being measured, before and after the catalyst, at approximately hourly intervals. Before each test the rig was run for two hours with a non-active catalyst support in position to allow the reactor walls to come to equilibrium with the lead species present in the exhaust gas stream.

Catalysts B C and D were prepared by mixing alumina and a base metal oxide together, milling the mixture and applying it to a substrate in the form of a slurry before calcining at 550° C. The catalyst was impregnated with a solution containing platinum and calcined at 650° C. The loading of platinum was 40 g ft$^{-3}$ and of the base metal component 400 g ft$^{-3}$. Catalyst A and E were prepared as above but with no base metal component present.

Catalyst F was prepared by coating a substrate with a slurry of alumina, firing at 550° C., and impregnating first with a solution containing nickel and molybdenum salts and firing at 400° C. and then with a solution containing platinum and firing at 650° C. The loading of the base metal component was 400 g ft$^{-3}$.

Table 1 below details the base metal component used, the washcoat loading and the substrates used for the catalysts.

TABLE 1

| Catalyst | Base metal component | Washcoat loading (g in$^{-3}$) | Substrate used |
| --- | --- | --- | --- |
| A | None | 2.36 | ceramic cordierite 300 cell in$^{-2}$ |
| B | $SnO_2$ | 2.30 | ceramic cordierite 300 cell in$^{-2}$ |
| C | $WO_3$ | 2.63 | ceramic cordierite 300 cell in$^{-2}$ |
| D | $TiO_2$ | 2.66 | ceramic cordierite 300 cell in$^{-2}$ |
| E | None | 4.93 | metallic fecralloy 600 cell in$^{-2}$ |
| F | $NiMoO_4$ | 5.43 | metallic fecralloy 600 cell in$^{-2}$ |

The accompanying drawings demonstrate the results obtained with the indicated catalysts. Of these drawings, FIG. 1 is a graph of % conversion efficiency as ordinate vs. ageing time in hours comparing the two catalyst, A and B;

Figure 1:
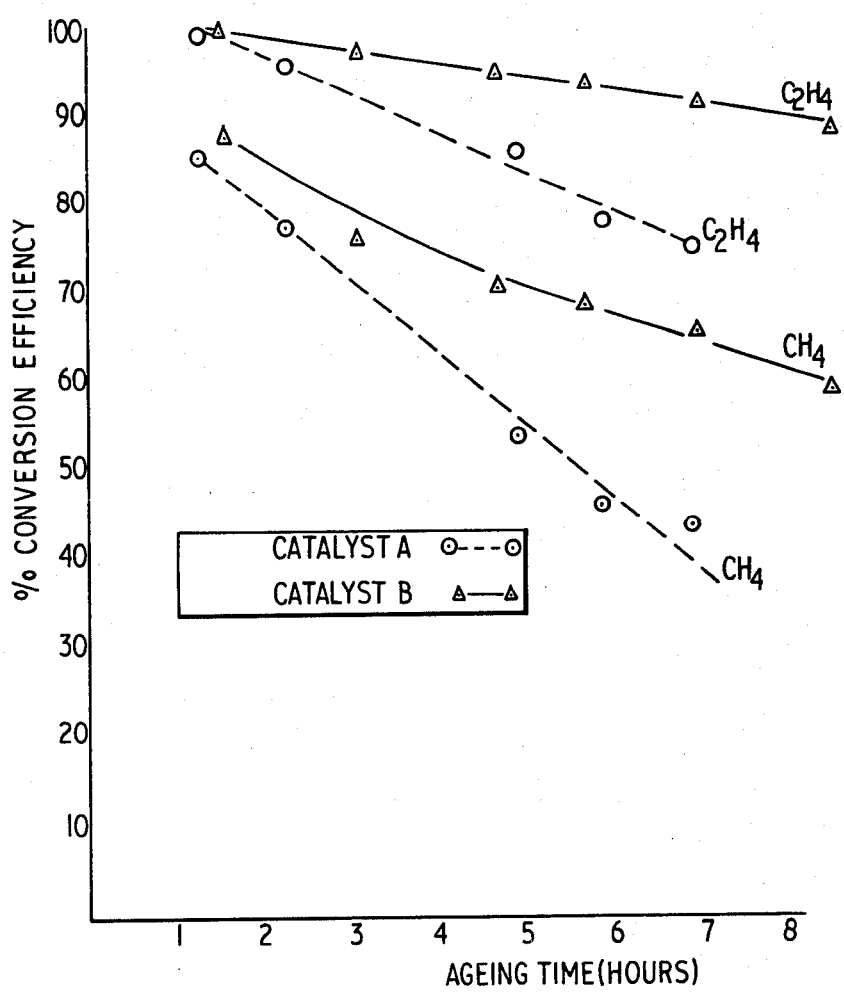
Figure 2:
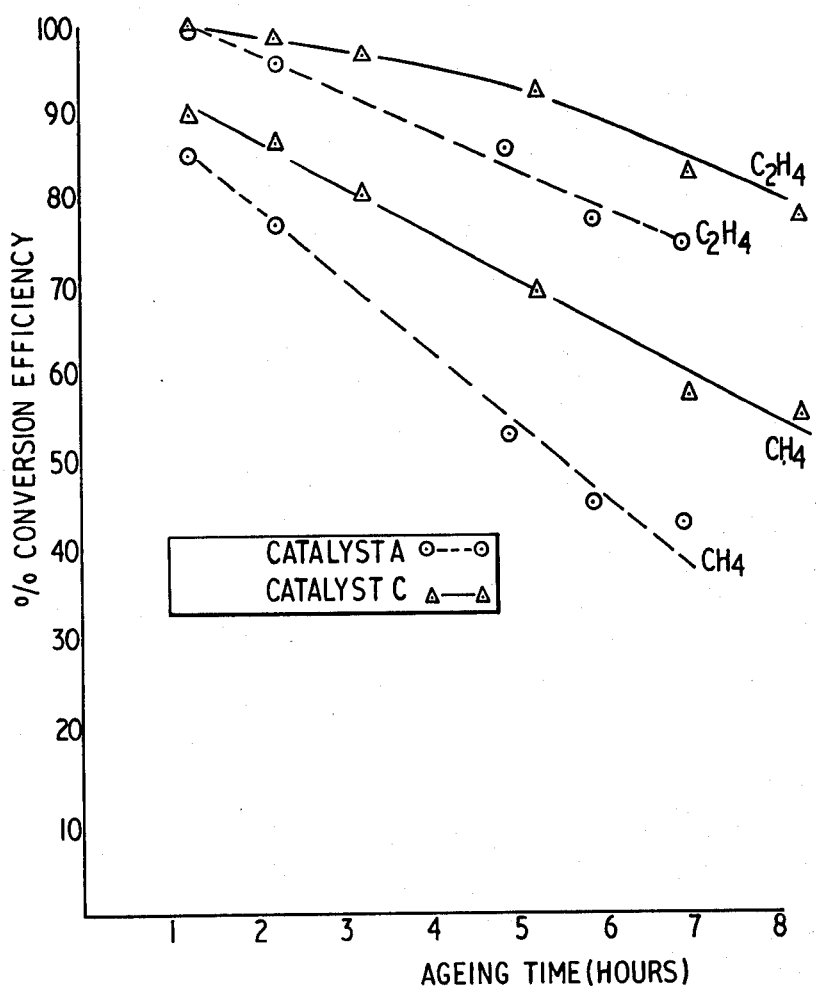
FIG. 2 is a graph of % conversion efficiency as ordinate vs. ageing time in hours comparing the two catalyst A and C.
Figure 3:
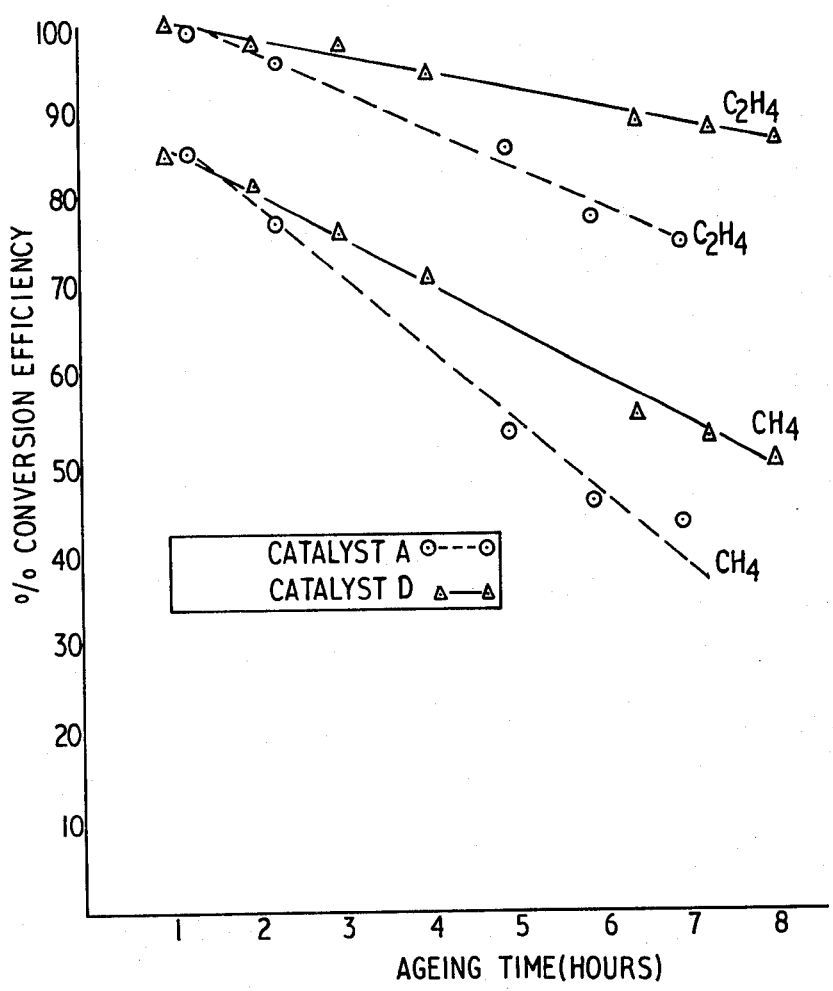
FIG. 3 is a graph of % conversion efficiency as ordinate vs. ageing time in hours comparing the two catalyst A and D.
Figure 4:
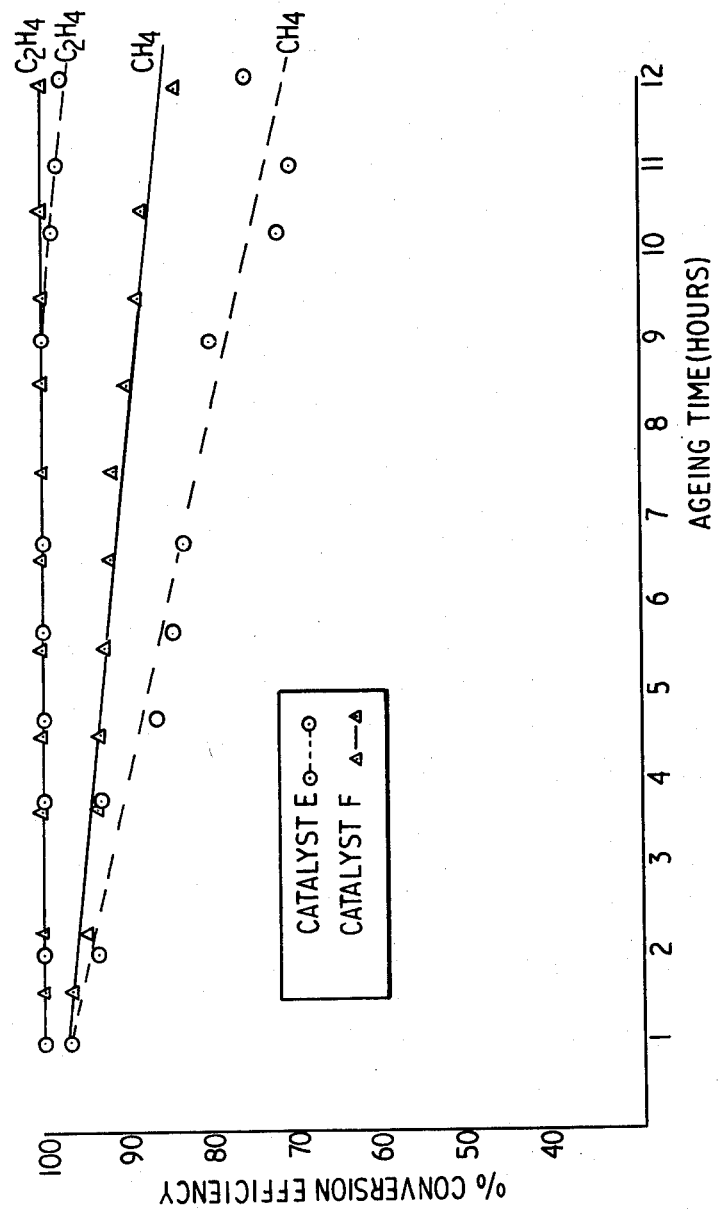
FIG. 4 is a graph of % conversion efficiency as ordinate vs. ageing time in hours comparing the two catalyst, E and F.

More particularly the results of the tests as shown in FIGS. 1-4 show the deactivation, decreasing conversion efficiency, occurring for catalysts A–F for a time interval of 7–8 hours. The catalysts of the invention B,C and D deactivate at a lower rate than catalyst A whilst catalyst F (also of the invention) deactivates more slowly than catalyst E, catalysts A and E containing platinum but not base metal component. After 12 hours, the conversion efficiency of F is still of the order of 100% for $C_2H_4$ and the efficiency of $CH_4$ is 85%, higher than for any of the other catalysts.

Table 2 below gives details of the rates of loss of efficiency of the catalysts for various hydrocarbons.

TABLE 2

| Catalyst | Substrate | Rate of loss of efficiency (% hr$^{-1}$) | | |
| --- | --- | --- | --- | --- |
| | | $CH_4$ | $C_2H_6$ | $C_2H_4$ |
| A | ceramic | 7.79 | 4.34 | 4.33 |
| B | ceramic | 3.55 | 2.54 | 1.67 |
| C | ceramic | 4.94 | 4.98 | 3.14 |
| D | ceramic | 5.22 | 3.68 | 1.93 |
| E | metallic | 2.26 | 4.07 | 0.181 |
| F | metallic | 1.00 | 0 | 0 |

Thus, F is the most lasting catalyst having a metallic substrate, the highest washcoat loading and a base metal component and in which the refractory metal oxide is applied to the substrate before being impregnated with the base metal and then with platinum.

Catalyst E is the next most lasting (although the rate of loss of efficiency for $C_2H_6$ was not low) in spite of not having a base metal component, while it has a high washcoat loading and a metallic substrate.

Catalyst A having no base metal, a ceramic substrate and a low washcoat loading has the most inefficiency.

Catalysts B, C and D with the ceramic substrate, low washcoat loadings and a base metal component have intermediate efficiencies.

Therefore, the use of metallic substrate is an important contributing factor to both conversion efficiency and rate of loss of efficiency and efficiency is improved by applying the refractory metal oxide first as for F. The absence of a base metal from E did not substantially affect the overall efficiency for $CH_4$ and $C_2H_4$, although it may contribute in the case of $C_2H_6$, for which efficiency loss was relatively high.

The effect of not using a base metal is demonstrated by A which had similar conditions otherwise to B, C, and D and was clearly the most inefficient. The values of efficiency loss rates for B,C and D were not very much less than for A, however, which tends to further indicate the importance of the substrate and washcoat loading.

The conversion efficiency and the lasting quality of catalyst F therefore was very good indeed and the three main factors are all important in contributing to the effectiveness of the catalyst.

We claim:

1. A method for the oxidation of exhaust comprising oxygen and products of combustion in a spark ignition internal combustion engine of fuel containing a lead moiety and a lead scavenger, said method comprising passing the exhaust gas through a catalyst consisting essentially of a mixture of one or more platinum group metals, at least some of which is platinum, and $WO_3$, $TiO_2$ or $NiMoO_4$ deposited upon a substrate in the form of a monolithic cellular structure made from ceramic or metallic material coated with alumina.

2. A method according to claim 1, wherein the substrate is a monolithic structure made from a ceramic material coated with alumina.

3. A method according to claim 2, wherein the ceramic material is zircon-mullite, mullite, alumina sillimanite, magnesium silicate, kaolin clay, zircon, petalite, spodumene, cordierite or alumina silicate.

4. A method according to claim 1, wherein the substrate is a monolithic structure made from a metallic material coated with alumina.

5. A method according to claim 4, wherein the metallic material is an oxidation-resistant metal or alloy.

6. A method according to claim 1, wherein the loading of the alumina is in the range 0.5–20 g in$^{-3}$.

7. A method according to claim 1, wherein the loading of the alumina is in the range 2–6 g in$^{-3}$.

8. A method according to claim 1, wherein the loading of the alumina is in the range 4–6 g in$^{-3}$.

9. A method according to claim 1, wherein the loading of the base metal is in the range 50–2000 g ft$^{-3}$.

10. A method according to claim 1, wherein the loading of the base metal is 400 g ft$^{-3}$.

11. A method according to claim 9, wherein the loading of the platinum group metal or metals is in the range 10–150 g ft$^{-3}$.

12. A method according to claim 1, wherein the loading of the platinum group metal or metals is 40 g ft$^{-3}$.

13. A method for the oxidation of exhaust comprising oxygen and products of combustion in a spark ignition internal combustion engine of fuel containing a lead moiety and a lead scavenger without using direct ignition, said method comprising passing the exhaust gas through a catalyst consisting essentially of a mixture of one or more platinum group metals, at least some of which is platinum itself, and $NIMoO_4$ deposted upon a substrate in the form of a monolithic cellular structure made from ceramic or metallic material coated with alumina.

* * * * *